United States Patent

Hiermaier et al.

Patent Number: 6,153,324
Date of Patent: Nov. 28, 2000

[54] CURRENT-CARRYING COMPONENT FOR A FUSED CARBONATE FUEL CELL WITH ANTICORROSIVE COATING

[75] Inventors: Manfred Hiermaier, Groebenzell; Reinhard Klose, Munich; Joerg Wind, Immenstaad, all of Germany

[73] Assignee: MTU Motoren-und Turbinen-Union Friedrichshafen GmbH, Friedrichshafen, Germany

[21] Appl. No.: 09/230,047

[22] PCT Filed: Jul. 15, 1997

[86] PCT No.: PCT/EP97/03777

§ 371 Date: Aug. 4, 1999

§ 102(e) Date: Aug. 4, 1999

[87] PCT Pub. No.: WO98/04012

PCT Pub. Date: Jan. 29, 1998

[30] Foreign Application Priority Data

Jul. 17, 1996 [DE] Germany .................. 196 28 823

[51] Int. Cl.[7] ........................................... H01M 8/14
[52] U.S. Cl. ................................. 429/16; 429/44
[58] Field of Search ........................ 429/16, 44

[56] References Cited

U.S. PATENT DOCUMENTS 4,555,453  11/1985  Appleby ..................... 429/41

FOREIGN PATENT DOCUMENTS 195 23 637 A1  7/1996  Germany.

OTHER PUBLICATIONS

"Carbonate Fuel Cell Endurance: Hardware Corrosion and Electrolyte Management Status", C.Y. Yuh et al., Extended Abstracts Spring Meeting 1993 May, 16–21 Honolulu Pennington, U.S., vol. 93/1, 1993, pp. 1518–1519.
Chemical Abstracts, vol. 111, No. 8, Aug. 21, 1989, JP 01 003 962 A, Atsushi Akimoto et al., Jan. 9, 1989.
Patent Abstracts of Japan, vol. 014, No. 252, JP 02 072562 A, Harufuji Yasuyuki, Mar. 12, 1990.
Patent Abstracts of Japan, vol. 009, No. 270, JP 60 115173 A, Iwaki Tsutomu, Jun. 21, 1985.

Primary Examiner—Maria Nuzzolillo
Assistant Examiner—M. Wills
Attorney, Agent, or Firm—Evenson, McKeown, Edwards & Lenahan, P.L.L.C.

[57] ABSTRACT

The invention relates to corrosion proofing of current-carrying components of molten carbonate fuel cells. In particular, the invention relates to a current-carrying component for a molten carbonate fuel cell, particularly an anode current collector or bipolar plate, with a substrate made of stainless steel and with a corrosion proofing coating provided on the substrate to protect the component from the anode gas atmosphere and the molten electrolyte of the fuel cell.

7 Claims, 1 Drawing Sheet

CURRENT-CARRYING COMPONENT FOR A FUSED CARBONATE FUEL CELL WITH ANTICORROSIVE COATING

BACKGROUND AND SUMMARY OF INVENTION

The invention relates to corrosion proofing of current-carrying components of molten carbonate fuel cells. In particular, the invention relates to a current-carrying component for a molten carbonate fuel cell, particularly an anode current collector or bipolar plate, with a substrate made of stainless steel and with a corrosion proofing coating provided on the substrate to protect the component from the anode gas atmosphere and the molten electrolyte of the fuel cell.

The conditions prevailing in the anode chamber of a molten carbonate fuel cell—carburizing atmosphere and low partial pressure of oxygen and presence of molten lithium and potassium carbonate—lead to rapid corrosion of the stainless steel components contained in the molten carbonate fuel cells. This corrosion is considerably accelerated by the high temperatures prevailing when molten carbonate fuel cells are operated. The reason for this is that the oxide layers formed in the carburizing, reducing atmosphere, by contrast to the oxide layers formed in an oxidizing atmosphere, are not dense or stable and are thus unable to protect the high alloy stainless steel used. The use of steels containing aluminum or the aluminizing of steels otherwise frequently chosen for corrosion proofing of stainless steels in a carburizing atmosphere suggests itself for current-carrying parts for use in fuel cells, namely in particular anode current collectors or bipolar plates, due to the very high electrical resistance of the resulting oxide layers.

A further problem is the tendency of the molten salts of the electrolyte to creep on such metal components. This creep is one of the electrolyte's loss mechanisms and hence places a limit on service life. Moreover, creep favors contamination of a cracked gas reaction catalyst provided for operation of the molten carbonate fuel cells and makes the use of direct internal reformation impossible although it would have been especially advantageous.

In principle, corrosion of the stainless steel components and creep of the molten salts on the metal components in the anode chambers of molten carbonate fuel cells can be prevented by coating the stainless steel sheets with nickel, as has been common in the past. Nickel is inert in the atmosphere contained in the anode chamber and is not wetted by the melt. When the components are flat, they are coated with nickel for example by plating and when the components have three-dimensional surfaces, they are coated galvanically. However previously unsolved problems arise at this point. With galvanically nickel-coated parts, the problem generally arises that the layers formed have pores. To make the porous layers impermeable, the nickel applied galvanically to the thinnest points must be at least 50 $\mu$m thick. In components with a three-dimensional form, like a current collector used on the anode side, in the most favorable case a thickness ratio of 2:1 from the thickest to the thinnest points can be achieved, and this must be borne in mind when choosing the coating thickness. However, even with a thickness of 50 $\mu$m, diffusion of components of the stainless steel such as Cr and Fe along the grain boundaries of the nickel layer to the surface of the component and diffusion of oxygen from the surface into the component are observed. This leads to oxide formation at the grain boundaries of the nickel layer and at the interface between the nickel layer and the stainless steel substrate.

DE 195 23 637 A1 already discloses a corrosion proofing coating for current-carrying components of molten carbonate fuel cells, in particular anode current collectors or bipolar plates, in which a thin layer of a nondiffusing material is applied to a substrate as a diffusion barrier layer and a thin layer of a corrosion-proof material is applied to the diffusion barrier layer. The substrate used is a stainless steel and the corrosion proofing layer may be made of nickel, gold, or copper.

The goal of the invention is to produce a current-carrying component for a molten carbonate fuel cell which has improved corrosion proofing.

This problem is solved by a current-carrying component for a molten carbonate fuel cell according to the present invention.

According to the invention, a current-carrying component for a molten carbonate fuel cell, particularly an anode current collector or bipolar plate, is produced which has a stainless steel substrate and a corrosion proofing coating on the substrate to protect the component from the anode gas atmosphere and from the molten electrolyte of the fuel cell. At least a first layer and a second layer made of different corrosion proofing materials with good electrical conductivity are formed on the substrate. The first layer is formed at the surface of the component and the second layer is formed between the first layer and the substrate. The first layer consists of a material that is inert to the anode gas atmosphere and is not wetted by the molten electrolyte, preferably of nickel, gold, or copper, while the second layer consists of a material that essentially does not mix with the material of the first layer, namely silver. The latter feature of not mixing relates to the normal range of operating temperatures of molten carbonate fuel cells, namely a temperature range of approximately 600 to 700° C.

The use of silver is particularly advantageous in embodiments in which the first layer consists of nickel. In this case, the silver migrates along the grain boundaries of the nickel, thus preventing diffusion of components of the stainless steel, and of oxygen. This prevents formation of oxides at the grain boundaries and at the interface between the nickel coating and the substrate, so that the nickel does not diffuse into the substrate and there is no perceptible interdiffusion of the two layer materials.

According to a further embodiment of the invention, three or more layers are formed on the substrate, with one or more first layers consisting of a material inert to the anode gas atmosphere and not wetted by the molten electrolyte, preferably nickel, gold, or copper, and one or more second layers made of a material that essentially does not mix with the material of the first layers, namely silver, and these layers are disposed alternately. The advantage of this is an improved protective action of the corrosion proofing coating.

According to one particularly advantageous embodiment, a first layer is formed at the surface of the component, said layer consisting of a material inert to the anode gas atmosphere and not wetted by the molten electrolyte.

This prevents the corrosive anode gas atmosphere and the molten electrolyte from attacking the outermost layer of the component.

According to one embodiment, the first layers are made of the same material, and according to another embodiment the second layers are made of the same material. The advantage of this is to simplify the manufacturing process in forming the corrosion proofing coating on the component.

According to a particularly advantageous embodiment, the first layers consist of nickel and the second layers consist of silver. In this case, when the fuel cell is heated, the silver migrates along the grain boundaries of the nickel, thus preventing diffusion of stainless-steel components and oxygen, so that there is no oxide formation at the grain boundaries or at the interface between the coating and the substrate. Diffusion of the nickel into the basic material and interdiffusion between the two layer materials are prevented. Due to the formation of several layers, an optimum protective action is achieved.

Embodiments of the invention will be described below with reference to the drawing:

DETAILED DESCRIPTION OF THE DRAWINGS

Figure 1:
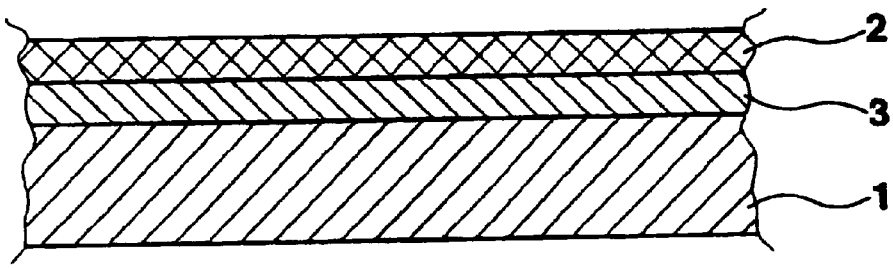
FIG. 1 is a schematic cross section through a current-carrying component provided with a corrosion proofing coating according to a first embodiment of the invention.

FIG. 1 shows a cross section of a current-carrying component for a molten carbonate fuel cell such as an anode current collector or a bipolar plate which consists of a substrate 1 made of stainless steel on which a corrosion proofing coating to protect the component against the anode gas atmosphere and the molten electrolyte of the fuel cell is formed. The corrosion proofing coating consists of two layers 2, 3 made of different corrosion proofing materials which have good electrical conductivity. The first layer 2 is formed at the surface of the component and consists of a material that is inert to the anode gas atmosphere and is not wetted by the molten electrolyte. The second layer 3 is formed between first layer 2 and substrate 1 and consists of a material that, at least in the range of operating temperatures of approximately 600 to 700° C. prevailing when a molten carbonate fuel cell is operated, does not significantly mix with the material of the first layer.

In the embodiment described here, first layer 2 is made of nickel. Alternatively, the first layer can consist for example of gold or copper or of another material inert to the anode gas atmosphere and not wetted by the molten electrolyte. In the present embodiment, the second layer consists of silver. The use of silver for second layer 3 in current-carrying components in which nickel is used for first layer 2 has the advantage that when the fuel cell heats up, the silver migrates along the grain boundaries of the nickel, preventing diffusion of components of the stainless-steel material of the substrate, and of oxygen, so that oxides cannot form at the grain boundaries and/or at the interface between the protective coating and substrate 1. Hence, the nickel does not diffuse into the material of the substrate and there is no perceptible interdiffusion between the materials of the two layers 2 and 3.

Figure 2:
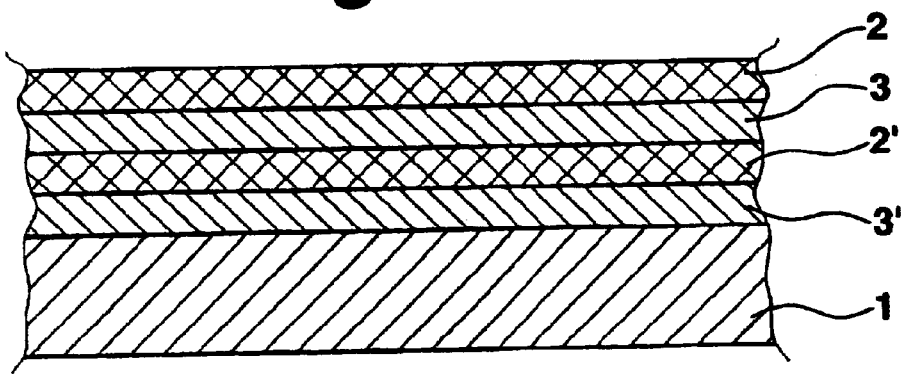
FIG. 2 is a schematic cross section through a current-carrying component provided with a corrosion proofing coating according to a second embodiment of the invention.

In the second embodiment of the invention shown in FIG. 2, a total of four layers are formed on a substrate 1 made of a stainless-steel material, of which two first layers 2, 2', which consist of a material that is inert to the anode gas atmosphere and not wetted by the molten electrolyte, and two second layers 3, 3' which consist of a material that essentially does not mix with the material of first layers 2, 2', disposed alternately. Thus, one of the first two layers 2, which consists of a material inert to the anode gas atmosphere and is not wetted by the molten electrolyte, is formed at the surface of the component, whereas one of the two second layers 3, which consists of a material that essentially does not mix with the material of first layers 2, 2', is formed on substrate 1.

In the present embodiment, the first layers 2, 2' are made of the same material and also the second layers 3, 3' are made of the same material. The first layers 2, 2' consist of nickel and the second layers 3, 3' consist of silver. By the alternating arrangement of the first layers 2, 2' made of nickel and the second layers 3, 3' made of silver, when the fuel cell heats up, silver migrates along the grain boundaries of the nickel, thus preventing diffusion of components of the stainless-steel material and of oxygen through nickel layers 2, 2', preventing oxides from forming at the grain boundaries and at the interface between substrate 1 and the corrosion proofing coating consisting of layers 2, 2', 3, 3'.

Figure 3:
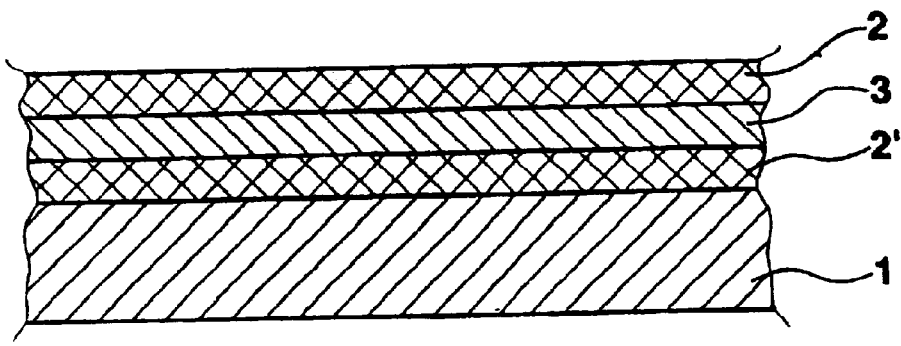
FIG. 3 is a schematic cross section through a current-carrying component provided with a corrosion proofing coating according to a third embodiment of the invention.

In the third embodiment of the invention shown in FIG. 3, a total of three layers are disposed on a substrate 1 made of a stainless steel material, namely two first layers 2, 2' which in this embodiment as well consist of nickel, which is inert to the anode gas atmosphere and is not wetted by the molten electrolyte, and a layer 3 disposed between the first two layers 2, 2' and made of silver, which essentially does not mix with the material of first layers 2, 2'. The component is protected from the anode gas atmosphere and the molten electrolyte by the first layer 2. When the fuel cell heats up, silver from the second layer 3 made of silver and located between the two first layers 2, 2' consisting of nickel migrates along the grain boundaries into each of the two nickel layers 2, 2' so that diffusion of components of the stainless-steel material of substrate 1 into nickel layer 2 disposed on substrate 1 and diffusion of oxygen through nickel layer 2 located at the surface of the component are prevented. Thus, once again formation of oxides at the grain boundaries and oxidation at the interface between substrate 1 and the corrosion proofing coating are prevented.

As a departure from the second and third embodiments of FIGS. 2 and 3, other embodiments with a larger number of layers are possible, in which three or more layers are formed on substrate 1, of which one or more first layers are made of a material that is inert to the anode gas atmosphere and/or is not wetted by the molten electrolyte, and of which one or more second layers consist of a material that essentially does not mix with the material of the first layers.

What is claimed is:

1. A current-carrying component for a molten carbonate fuel cell comprising:
    substrate made of stainless steel and having a corrosion proofing coating to protect the component from an anode gas atmosphere and a molten electrolyte of the fuel cell,
    wherein said coating comprises at least a first layer and a second layer (3) made of different corrosion proofing materials with good electrical conductivity,
    wherein said second layer is between said first layer and said substrate, and
    wherein said first layer comprises a material that is inert to the anode gas atmosphere and is not wetted by the molten electrolyte, and said second layer comprises silver and does not mix with the material of said first layer.

2. A current-carrying component according to claim 1, wherein the first layer is selected from the group consisting of nickel, gold, and copper.

3. A current-carrying component according to claim 1 wherein three or more layers are formed on said substrate comprising alternating first and second layers.

4. A current-carrying component according to claim 3, wherein said first layer is formed at the surface of the component.

5. A current-carrying component according to claim 3 wherein said first layers are made of the same material.

6. A current-carrying component according to claim 3 wherein said second layers are made of the same material.

7. A current-carrying component according to claim 1, wherein said molten carbonate fuel cell is an anode current collector or bipolar plate.

* * * * *